United States Patent [19]

Reininger et al.

[11] 4,013,721
[45] Mar. 22, 1977

[54] PROCESS OF CATALYTIC OXIDATION OF LUPULONES TO HULUPONES

[75] Inventors: Wolfgang Reininger, Munich; Alfons Hartl, Germering, both of Germany

[73] Assignee: Atlantic Research Institute Limited, Nassau, Bahamas

[22] Filed: Sept. 13, 1973

[21] Appl. No.: 397,106

[30] Foreign Application Priority Data

Sept. 13, 1972 Germany .......................... 2244895

[52] U.S. Cl. ...................... 260/586 D; 260/586 P
[51] Int. Cl.² ......................................... C07C 45/00
[58] Field of Search ............................... 260/586 D

[56] References Cited

UNITED STATES PATENTS 2,652,333  9/1953  Nilsson et al. ...................... 99/59.5

FOREIGN PATENTS OR APPLICATIONS 1,300,485  8/1969  Germany ...................... 260/586 D

OTHER PUBLICATIONS

Wright, "J. Chem. Soc.", pp. 1769–1773, (1963).
Brown et al., "J. Chem. Soc.", pp. 4774–4778 (1964).
Wright, "Proc. Chem. Soc.", p. 315 (1961).
Stevens et al., "J. Chem. Soc.", pp. 1763–1768 (1963).

Primary Examiner—Norman Morgenstern
Attorney, Agent, or Firm—Browdy and Neimark

[57] ABSTRACT

A method for the production of hulupones by oxidizing lupulones with oxygen in the presence of a catalyst in a polar alkaline medium. The catalysts used include noble metals, oxides of transition metals and particularly oxide metals of Groups IB and VII B, and bismuth oxide on a carrier of kieselguhr, activated carbon, calcium phosphate, magnesium oxide, dolomite, fired clay and strongly acid cation exchangers.

13 Claims, No Drawings

PROCESS OF CATALYTIC OXIDATION OF LUPULONES TO HULUPONES

The invention relates to a method for the production of hulupones by oxidizing lupulones with oxygen in the presence of a catalyst.

The lupulone group constitutes a substantial proportion of the hop resins contained in the hop cone but cannot be used for brewing purposes because lupulones are practically insoluble and therefore are discarded in the conventional brewing process.

This also applies particularly to the more recent use of hop bitter substances, for which purpose the humulones, which are valuable for the brewing process, are separated and isomerized in a separate process. The remaining bitter substance, free of humulones, also called "base extract", has a high lupulone content. Its conversion to a beer-soluble bitter substance would lead to a substantially enhanced utilization of hops.

Hulupones, which are distinguished by good solubility and agreeable bitter substances, may occur in aged hops as transformation products of lupulone.

This useful property had the consequence that shortly after its discovery research was conducted into the possibility of intentional conversion of lupulones into hulupones. According to information gained from the first research work, lupulone is treated with oxygen in the presence of sodium sulphite in alcoholic solution (D. Wright, Proc. Chem. Soc. 315, 1961 and D. Wright, J. Chem. Soc. 1769, 1963). The yields were low, (maximum 30 percent) and the reaction times long (1–2 days). The action of sodium peroxydisulphate on lupulone in ethanol (M. Brown, J. S. Burton, R. Stevens, J. Chem. Soc. 4774, 1964) also resulted in poor yields, with a maximum of 28 percent. In another process (German Auslegeschrift 1,300,485) material containing lupulone in trichloroethylene is treated with $O_2$. The reaction times are stated to be 24 hours and the yields of hulupones or "similar" substances 39 percent. The Applicants' own experiments with pure lupulones revealed that the actual yields of hulupones barely exceed 16 percent. An improvement of the yield of hulupones was provided by a new process for the photosensitized oxidation of lupulone according to U.S. Ser. No. 348,305, filed Apr. 6, 1973, now abandoned.

The object of the present invention and the problem underlying it consist in effecting, by a technically more elegant and simple process, the hitherto inadequate or expensive conversion of the normally non-utilizable lupulones into hulupones in a controlled, rapid, and economic reaction, which is particularly suitable for a continuous process. This is achieved by catalytic oxidation under defined reaction conditions.

The invention accordingly relates to a method for the catalytic oxidation of lupulones or material containing lupulones in a liquid medium by means of oxygen or gases containing oxygen, in which lupulone or material containing lupulone is dissolved or suspended in a polar alkaline medium, the solution or suspension is brought into contact with a catalyst, which consists of finely divided noble metal or an oxide of a transition metal, or a mixture of such oxides, the said metal or oxide being applied to a carrier of kieselguhr, activated carbon, calcium phosphate, magnesium oxide, dolomite, fired clay, or a strongly acid cation exchanger; or which consists of one or more complexes of noble metals or transition metals.

The expression "oxide" as used throughout the present specification and claims also embraces the partly hydrated oxides and transition stages from hydroxide to oxide, such as occur when the transition metals precipitated as hydroxide are heated or calcined.

The noble metals and also oxides of metals in Groups I B and VII B of the Periodic system, and also oxides of bismuth and cobalt, are particularly suitable as catalysts. Cobalt oxide, bismuth oxide, manganese oxide, and copper oxide, and also mixtures of these oxides are particularly preferred.

Surprisingly, not all customary catalyst carriers are suitable for the method of the invention. Thus, for example, silica gel and aluminum oxides, which are very frequently used as catalyst carriers, are not suitable, whereas, surprisingly, fired clay, such as is used, for example, in the form of unglazed clay dishes or fired clay shaped bodies in organic chemistry and distillation technique, is suitable. With regard to the strongly acid cation exchangers, the synthetic resin exchangers containing sulphonic acid groups are particularly suitable, for example 9259 HL of Bayer or the various kinds of sulphonated Lewatites.

It is also possible to work in a completely homogeneous solution, in which case the catalyst must be in the form of a soluble complex salt which is stable in the alkaline range. Cobalt salcomine in methanol is, for example, suitable as a soluble catalyst for a homogeneous reaction.

The substrate of the oxidation is the lupulate anion. Consequently, all solvents in which lupulates are soluble, particularly water, methanol and other low alcohols, and also glycols, acetone, acetonitrile, low esters, or sulpholane and mixtures thereof are suitable for the reaction. In principle, all polar solvents are suitable. It has been found that the higher the dielectric constant, the more suitable they are.

Of the solvents, water is naturally preferred. In order to obtain higher concentration in the reaction medium, a mixture of water and methanol is frequently used, since in this case the solubility of the starting materials is better. The operation is carried out in solution, but this term is intended to include suspensions.

The reaction is carried out under alkaline conditions, preferably with a pH value of at least 10, or better still from 11 to 14, especially 13–14. The concentration of the alkaline solution may be from below 0.1 normal to 10 normal. The only essential requirement is that the lupulate anion should be present and that the medium should be sufficiently alkaline for the reaction. Concentrations from 0.1 to 0.5 normal are therefore particularly preferred. The alkalinity may also be adjusted with organic bases; thus, for example, the reaction takes place very satisfactorily with triethylamine.

The reaction takes place at temperatures between 0° C and 100° C or over, but temperatures between 40° C and 60° C are preferred, since the reaction then takes place sufficiently quickly and supplies the best yields.

The rate of reaction is directly dependent on the partial oxygen pressure, so that in principle an increase in pressure accelerates the reaction. For practical reasons the operation is conveniently carried out under normal pressure with oxygen (cylinder oxygen). The process takes place very satisfactorily with air, but because of the larger amounts which have to be passed through, undesirable foaming occurs.

Both the rate of reaction and the yield depend to a considerable extent on the type of catalyst and carrier material. Thus, for example 10 percent cobalt oxide and platinum on kieselguhr show the highest reaction rates, whereas 10 percent bismuth oxide on kieselguhr leads to the purest products. Since the differences in purity are generally not very great, the catalyst providing the quickest reaction is generally preferred.

Through the use of cobalt oxide, accompanied by 10 percent bismuth oxide, on kieselguhr as a carrier it is possible to achieve a rate of reaction at which the reaction is completed within only a few minutes at normal temperature and normal pressure. This method is therefore particularly suitable for continuous operation of the process.

In addition to their long life, insensitivity to poisons, and ease of removal from the reaction medium, noble metals on carriers for use as catalysts provide the particular advantage that they do not in any way pollute the reaction product.

The carrier material has an evidently synergistic influence, materials based on silicates showing the most favorable effect. Other carrier materials, such as for example silica gel and in particular aluminum oxide, are not very suitable.

More specifically, the procedure is as follows: lupulone is dissolved together with the desired amount of alkali (for example potassium hydroxide or sodium hydroxide solution) in the desired solvent, or the organic solution containing lupulone is extracted with alkali, heated to a selected temperature, the catalyst is added, and oxidation is effected by introducing oxygen or air.

After absorption of the calculated amount of oxygen, or of a predetermined or experimentally determined excess, the reaction is stopped by terminating the introduction of gas or stirring.

The catalyst is then filtered off from the solution and the latter is acidified to a pH value of 1 and completely extracted with hexane. Potassium hulupate solutions of great purity, which are completely soluble in water or beer, can be obtained from the hexane solution by extraction with aqueous potassium hydroxide solution, optionally with the addition of propylene glycol, so as to obtain a pH of 5–8.

Considerable differences exist in respect of solubility between K and Na salts, since, for example, potassium hulupate is soluble in water to the extent of 100 g/l, whereas sodium hulupate is soluble only to the extent of less than 40 g/l. Hulupone itself is soluble only to the extent of about 1.1 – 1.6 g/l. The potassium salt of hulupone is therefore 2 – 2½ times as soluble as the sodium salt, and, what is still more important, the speed of dissolution of potassium hulupate is substantially higher because of easier hydration. This is important for practical use, which requires the quickest possible dissolution in beer of more or less concentrated solutions. The improved solubility thus permits combination with isohumulone preparations. The use of potassium salts in the production of hulupone preparations is therefore particularly preferred as compared with that of sodium salts. If a solubilizer, such as, for example 1,2-propylene-glycol is added, solubility is still further improved.

The following Examples illustrate the invention.

EXAMPLE 1

8 g lupulone are dissolved in 50 ml methanol mixed with 3 ml 10N sodium hydroxide solution, and filtered in a laboratory autoclave having a capacity of 120 percent 100 mg 10 per platinum on activated carbon (Engelhard catalyst) are then added, the autoclave is closed, and a pressure of 40 atmospheres gauge oxygen applied. The autoclave is placed in a water bath and heated to 50° C, the stirrer is put into operation, and the absorption of oxygen is followed on the basis of the drop in pressure. After 30 minutes the reaction is completed. The autoclave is cooled, relieved of pressure, and the catalyst filtered off. The solution is then mixed with an equal amount of water, acidified, and twice extracted with 100 ml n-hexane on each occasion. The hexane solutions are combined, dried over sodium sulphate, and evaporated. The residue comprises 6.4 g of a brownish oil having a hulupone content of 44 percent.

EXAMPLE 2

For comparison purposes the same operation is carried out without a catalyst. The theoretical amount of oxygen is not reached after a reaction time of 12 hours. The yield of hulupone amounts to 14.2 percent.

EXAMPLE 3

20 g base extract containing a lupulone fraction of 7 g are dissolved in 150 ml hexane and filtered. The clear solution is shaken up with a mixture of 50 ml methanol, 25 ml water, and 4 ml 10N sodium hydroxide solution. The aqueous-methanol phase is introduced into the laboratory autoclave, 100 mg catalyst containing 10 percent platinum on activated carbon (Engelhard) are introduced and treatment is carried out as in Example 1. The reaction is completed after 60 minutes. The titrimetric yield of hulupone amounts to 47 percent.

EXAMPLE 4

4 g lupulone are dissolved, with stirring, in 100 ml 0.5 N sodium hydroxide solution, filtered into a 250 ml three necked flask provided with a gas inlet tube, reflux condenser, and internal thermometer, and mixed with 1 g catalyst (see Table). After flushing out with oxygen, the apparatus is heated to the predetermined temperature. The lupulate solution is then oxidized with vigorous stirring, while oxygen is passed through. After completion of the reaction, which can be recognized by a marked fall in the absorption of oxygen, or after the consumption of 250 ml of oxygen, the solution is allowed to cool, the catalyst is filtered off, and the solution is acidified and twice extracted with 50 ml n-hexane on each occasion. The combined hexane solutions are dried over sodium sulphate and evaporated. The hulupone is obtained in the form of a bright yellow to brownish yellow oil (see Table).

EXAMPLE 4a

The same mixture, with 1 g catalyst and with aluminum oxide as carrier material (10 percent cobalt oxide on $Al_2O_3$) requires 150 minutes at 50° C to absorb the necessary amount of oxygen. The yield of hulupone amounts to only 23 percent.

TABLE

| Catalyst | Carrier | Temperatures | Reaction time | Yield |
|---|---|---|---|---|
| 100 mg platinum 10 per cent on | activated carbon | 88° C | 24 mins | 42% |
| 100 mg palladium 5 per cent on | activated carbon | 50° C | 90 mins | 34% |
| 100 mg rhodium 5 per cent on | activated carbon | 50° C | 122 mins | 40% |
| 100 mg gold 5 per cent on | kieselguhr | 50° C | 90 mins | 34% |
| 100 mg silver 10 per cnt on | activated carbon | 50° C | 70 mins | 27% |
| 100 mg platinum 5 per cent on | kieselguhr | 50° C | 15 mins | 51% |
| Manganese oxide 10 per cent on | kieselguhr | 88° C | 46 mins | 42% |
| Copper oxide 10 per cent on | kieselguhr | 88° C | 20 mins | 41% |
| Cobalt oxide 10 per cent on | kieselguhr | 88° C | 12 mins | 41% |
| Bismuth oxide 10 per cent on | kieselguhr | 88° C | 47 mins | 50% |
| Copper oxide 0.5 per cent + manganese oxide 9.5% on | kieselguhr | 89° C | 27 mins | 48% |
| Manganese oxide 5 per cent + copper oxide 3 per cent + cobalt oxide 1.5 per cent + silver oxide 0.5 per cent on | Kieselguhr | 80° C | 25 mins | 43% |
| Cobalt oxide 10 per cent + bismuth oxide 1 per cent on | kieselguhr | 88° C | 6 mins | 46% |
| Cobalt oxide 10 per cent + bismuth oxide 1% on | " | 75° C | 5³⁰mins | 48% |
| bismuth oxide 1% on | " | 65° C | 4 mins | 48% |
| bismuth oxide 1% on | " | 40° C | 12³⁰mins | 47% |
| bismuth oxide 1% on | " | 0° C | 19 mins | 47% |
| Cobalt oxide 10 per cent on | magnesium oxide | 50° C | 12 mins | 49% |
| Cobalt oxide 10 per cent on | calcium phosphate | 50° C | 10 mins | 39% |
| Cobalt oxide 10 percent on | ion exchanger | 50° C | 65 mins | 39% |
| Cobalt oxide 10 per cent on | clay | 50° C | 11 mins | 47% |
| Cobalt oxide 10 per cent on | silica gel H | 50° C | 6 mins | 47% |

EXAMPLE 4b

The same mixture with 1g of pure carrier material (MgO) instead of catalyst showed an oxygen absorption of only 49 ml after 170 minutes at 50° C.

EXAMPLE 5

20 g Basex (lupulone content 7 g) are dissolved in 150 ml hexane and shaken up with 150 ml 0.5 N sodium hydroxide solution. The aqueous phase is introduced into a reaction flask, mixed with 1 g 10 percent platinum on activated carbon (Engelhard), heated to 80° C, and treated with oxygen. The reaction is completed after 48 minutes. The catalyst is filtered off and after acidification the aqueous phase is twice extracted with 100 ml hexane on each occasion. After drying over sodium sulphate and evaporating the hexane, 8.2 g of a brown oil remain. The yield of hulupone amounts to 44.5 percent.

EXAMPLE 6

4 kg base extract (lupulone content 35.2 percent) are dissolved in 40 l hexane, filtered, and extracted in an extractor with 60 l of 0.4 N sodium hydroxide solution.

The clear reddish brown aqueous phase is mixed with 400 g catalyst (10 percent cobalt oxide + 1 percent bismuth oxide on kieselguhr), and introduced into a 120-liter stirring vessel equipped with a gas treatment turbine. Oxygen is then introduced at a pressure of 2 atmospheres gauge, and the mixture is heated to 30° C. After the gas treatment has started the temperature quickly rises to over 40° C, and the pressure drops to 0.5 atmospheres gauge. After 5 minutes the reaction is completed.

The catalyst is centrifuged off, the reaction solution is acidified to a PH of less than 1, and exhaustively extracted with hexane. After drying and evaporation, 1.4 kg crude hulupone having a hulupone content of 49.5 percent is obtained.

For the purpose of further purification, the hulupone-hexane solution is subjection to controlled extraction with a potassium hydroxide solution containing propylene glycol. By evaporation of the aqueous extract to a potassium hulupate concentration (based on hulupone of 20 percent, there is at the same time obtained a form which is suitable for use and which may optionally be mixed with isomerized hop extracts.

EXAMPLE 7

A 1.75 percent lupulone solution in 0.3 N sodium hydroxide solution is passed through a continuous apparatus consisting of a mixing vessel, pump, heated reaction vessel with a gas treatment turbine and a filter. The catalyst (10 percent cobalt oxide + bismuth oxide 1 percent on kieselguhr) is introduced in such proportions that the catalyst concentration amounts to about 1 percent. The suspension is pumped through the reaction vessel and reacted by the mixing-in of of oxygen at a pressure of about 0.1 atmosphere gauge at 50° C.

The mean residence time amounts to 10 minutes. The catalyst is filtered off and the reaction solution worked up as in Example 6.

The yield of hulupone, referred to lupulone, is better than 50 percent.

We claim:

1. A process of catalytic oxidation wherein lupulone or lupulone-bearing material is mixed into a polar alkaline medium in which lupulates are soluble and reacted with oxygen-containing gas in contact with a catalyst selected from the group consisting of noble metals, transition metals, and bismuth oxide applied to a carrier selected from the group consisting of kieselguhr, activated carbon, calcium phosphate, magnesium oxide, dolomite, fired clay and strongly acid cation exchangers.

2. A process of catalytic oxidation wherein lupulone-bearing material is dissolved in a polar alkaline solvent therefor and reacted with oxygen-containing gas in contact with a catalyst selected from the group consisting of complexes of noble metals and complexes of transition metals which are soluble in the solvent used and are stable in the alkaline range.

3. A process of catalytic oxidation wherein lupulone or lupulone-bearing material is suspended in a polar alkaline medium in which lupulates are soluble and reacted with oxygen in contact with a catalyst selected from the group consisting of the noble metals, the oxides of transition metals of Groups IB and VIIB of the Periodic Table and the oxides of bismuth and cobalt, applied to a carrier selected from the group consisting of kieselguhr, activated carbon, calcium phosphate, magnesium oxide, dolomite, fired clay and strongly acid cation exchangers.

4. A process in accordance with claim 3, wherein the process is performed at temperatures between 0° and 90° C.

5. A process in accordance with claim 3, wherein the process is performed at a pH value of 11 to 14.

6. A process in accordance with claim 3, wherein the process is performed at a pH value of 12.5 to 14.

7. A process in accordance with claim 3, wherein the process is performed in a potassium hydroxide or sodium hydroxide medium.

8. A process in accordance with claim 3, wherein the process is performed in a reaction medium having an alkali concentration of 0.1 to 1 normal.

9. A process in accordance with claim 3, wherein the reaction is terminated when the circulated amount of oxygen or a predetermined small excess has been consumed.

10. A process in accordance with claim 3, wherein the reaction product is obtained by acidifying the reaction medium, followed by extraction with an organic solvent which is immiscible with water.

11. A process in accordance with claim 10, wherein the reaction product obtained is converted by fractional extraction with KDH solution into potassium hulupate solution.

12. A process in accordance with claim 3, wherein the humulone-free bitter substance extracts obtained in the production of isohumulone are used as said lupulone or lupulone-bearing material.

13. A process in accordance with claim 11 wherein said conversion step includes the addition of a solubilizer for hulupate.

* * * * *